US011613592B2

(12) United States Patent
Gupta et al.

(10) Patent No.: US 11,613,592 B2
(45) Date of Patent: Mar. 28, 2023

(54) ZIEGLER-NATTA CATALYST SYSTEM WITH SELF-EXTINGUISHING PROPERTIES SUITABLE FOR OLEFIN POLYMERIZATION

(71) Applicant: RELIANCE INDUSTRIES LIMITED, Mumbai (IN)

(72) Inventors: Virendrakumar Gupta, Navi Mumbai (IN); Robert Grubbs, Pasadena, CA (US); Sunil Dhamaniya, Jaipur (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 291 days.

(21) Appl. No.: 16/967,286

(22) PCT Filed: Feb. 7, 2019

(86) PCT No.: PCT/IB2019/050982
§ 371 (c)(1),
(2) Date: Aug. 4, 2020

(87) PCT Pub. No.: WO2019/155393
PCT Pub. Date: Aug. 15, 2019

(65) Prior Publication Data
US 2021/0024662 A1 Jan. 28, 2021

(30) Foreign Application Priority Data
Feb. 7, 2018 (IN) .............................. 201821004697

(51) Int. Cl.
| C08F 4/649 | (2006.01) |
| C08F 4/651 | (2006.01) |
| C08F 110/06 | (2006.01) |
| C08F 4/659 | (2006.01) |
| C08F 2/38 | (2006.01) |
| C08F 4/654 | (2006.01) |
| C08F 10/02 | (2006.01) |
| C08F 10/06 | (2006.01) |

(52) U.S. Cl.
CPC ............ *C08F 4/65912* (2013.01); *C08F 2/38* (2013.01); *C08F 4/6493* (2013.01); *C08F 4/6494* (2013.01); *C08F 4/654* (2013.01); *C08F 10/02* (2013.01); *C08F 10/06* (2013.01)

(58) Field of Classification Search
CPC .............................. C08F 4/651; C08F 4/6557
See application file for complete search history.

(56) References Cited

U.S. PATENT DOCUMENTS

| 4,328,122 A | 5/1982 | Monte et al. |
| 5,218,052 A | 6/1993 | Cohen et al. |
| 2002/0119888 A1 | 8/2002 | De Miro |

FOREIGN PATENT DOCUMENTS

| WO | 2005/030815 | 4/2005 |
| WO | 2009/029487 A1 | 3/2009 |
| WO | 2009/152268 A1 | 12/2009 |

OTHER PUBLICATIONS

ISR for International Application PCT/IB2019/050982.
Written Opinion for International Application PCT/IB2019/050982.

*Primary Examiner* — Caixia Lu
(74) *Attorney, Agent, or Firm* — Ladas & Parry LLP

(57) ABSTRACT

The present disclosure relates to a Ziegler-Natta catalyst system with self-extinguishing properties suitable for olefin polymerization. The catalyst system of the present disclosure comprises a pro-catalyst, a co-catalyst, and an external donor having a mixture of a selectivity control agent and an activity control agent. The catalyst system of the present disclosure is adapted to prevent the temperature of the polymerization reaction to go beyond the softening temperature of the polymer, thereby exhibiting the self-extinguishing properties.

18 Claims, 1 Drawing Sheet

US 11,613,592 B2

Figure 1:
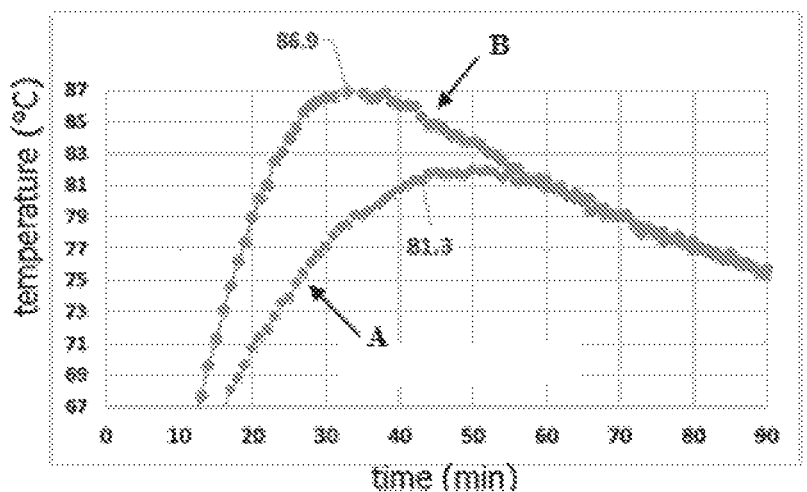

ZIEGLER-NATTA CATALYST SYSTEM WITH SELF-EXTINGUISHING PROPERTIES SUITABLE FOR OLEFIN POLYMERIZATION

RELATED APPLICATION

This application is a national phase entry under 35 USC 371 of International Patent Application No.: PCT/IB2019/050982 filed on 7 Feb. 2019, which claims priority from Indian Application No. 201821004697 filed on 7 Feb. 2018, the disclosures of which are incorporated in their entirety by reference herein.

FIELD

The present disclosure relates to a Ziegler-Natta catalyst system with self-extinguishing properties suitable for olefin polymerization.

DEFINITIONS

As used in the present disclosure, the following terms are generally intended to have the meaning as set forth below, except to the extent that the context in which they are used indicates otherwise.

Ziegler-Natta catalyst: A Ziegler-Natta catalyst, named after Karl Ziegler and Giulio Natta, is a catalyst used in the synthesis of polymers of 1-alkenes (alpha-olefins). The Ziegler-Natta catalyst comprises titanium compounds in combination with co-catalysts, organoaluminum compounds such as triethylaluminum, Al $(C_2H_5)_3$.

Self-extinguishing property: The term, "self-extinguishing" refers to a property applied to plastics and resins which will not support combustion in the absence of an outside flame. However, these products may be combustible as long as a flame is applied to them.

Activity limiting agent: The term "activity limiting agent" refers to an organic compounds that controls polymerization activity.

Selectivity control agent: The term "selectivity control agent" refers to an electron donor compound, wherein the compound is complexed with the organoaluminum compound (co-catalyst) separately or partially or totally.

Isotacticity: The term "isotacticity" refers to the polymer property wherein the polymer in which all the repeating units have the same stereochemical configuration.

Softening temperature: The term "softening temperature" refers to the temperature at which a material softens beyond some arbitrary softness.

BACKGROUND

The background information herein below relates to the present disclosure but is not necessarily prior art.

Ziegler-Natta catalyst systems comprises a pro-catalyst, a co-catalyst and at least one electron donor. These catalyst systems are used for producing polyolefin. The polymerization of olefins is an exothermic process. Therefore, the temperature of the reaction mixture of the polymerization process increases with time. If the temperature of the reaction mixture is increased beyond the softening temperature of the polyolefin, agglomeration of the polymer resins can take place, which will result in the formation of big chunks in the reactor. At commercial scale, formation of lumps creates operational issues, which cause fouling of the reactor. In view of the same, the reaction temperature during polymerization can be lowered by either designing the reactor in such a way that it can efficiently remove the heat of reaction and can maintain the desired reaction temperature during the polymerization or by the addition of an external reaction controlling agents which can deactivate the catalyst at predetermined reaction temperatures.

There is, therefore, felt a need for alternative catalyst system that is capable of effectively controlling the temperature of the polymerization process and mitigates the drawbacks mentioned hereinabove.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a Ziegler-Natta catalyst system with self-extinguishing properties.

Another object of the present disclosure is to provide a Ziegler-Natta catalyst system with self-extinguishing properties suitable for the olefin polymerization.

Yet another object of the present disclosure is to provide a process for preparation of a Ziegler-Natta catalyst system.

Still another object of the present disclosure is to provide a process for polymerization of olefin, wherein the temperature during polymerization reaction is maintained below the softening temperature of the polyolefin.

Other objects and advantages of the present disclosure will be more apparent from the following description, which is not intended to limit the scope of the present disclosure.

SUMMARY

The present disclosure relates to a Ziegler-Natta catalyst system with self-extinguishing properties suitable for olefin polymerization.

In accordance the present disclosure, the Ziegler-Natta catalyst system with self-extinguishing properties suitable for olefin polymerization being characterized by having a fluorinated ester of a long chain fatty acid with $C_{4-20}$ carbon atoms as an activity limiting agent.

The Ziegler-Natta catalyst system of the present disclosure comprises a pro-catalyst comprising a magnesium compound, a titanium compound and an internal donor; an organo-aluminum co-catalyst and an external donor having a mixture of a selectivity control agent and an activity limiting agent. The mole ratio of the co-catalyst to the titanium is in the range of 50:1 to 500:1, the mole ratio of the co-catalyst and the selectivity control agent is in the range of 2:1 to 50:1 and the mole ratio of the co-catalyst and the activity limiting agent is in the range of 2:1 to 10:1.

The present disclosure further relates to a process for in-situ preparation of a Ziegler Natta Catalyst system suitable for olefin polymerization. The process comprises charging a reactor with a hydrocarbon fluid medium and a predetermined amount of pro-catalyst comprising a magnesium compound, a titanium compound, and an internal donor, under inert atmosphere, to obtain a pro-catalyst slurry. A predetermined amount of an external done donor having a mixture of selectivity control agent and the activity limiting agent is added in the pro-catalyst slurry to obtain first slurry. An organo-aluminum co-catalyst is added to the first slurry to obtain the Ziegler Natta Catalyst system.

The present disclosure further relates to a process for the preparation of polyolefin by introducing an olefin in to the reactor comprising the Ziegler Natta Catalyst system. The olefin is introduced in the reactor to attain an olefin pressure in the range of 1 kg/cm² to 10 kg/cm² to obtain a reaction mixture. The olefin present in the reactor is subjected to polymerization by heating the reaction mixture at a temperature in the range of 40° C. to 75° C. under stirring for a time period in the range of 1 hour to 5 hours to obtain a product mixture. The polymerization of olefin is terminated by introducing a chain terminating agent to the reactor comprising the product mixture. The reactor after termination of the polymerization is cooled to a temperature in the range of 25° C. to 35° C. and after cooling the reactor is degassed to obtain a product mass. The product mass is filtered to obtain a solid and a filtrate. The solid is dried to obtain the polyolefin. Polyolefin obtained by the process of the present disclosure is characterized by the isotacticity greater than 97%.

BRIEF DESCRIPTION OF THE ACCOMPANYING DRAWING

Figure 2:
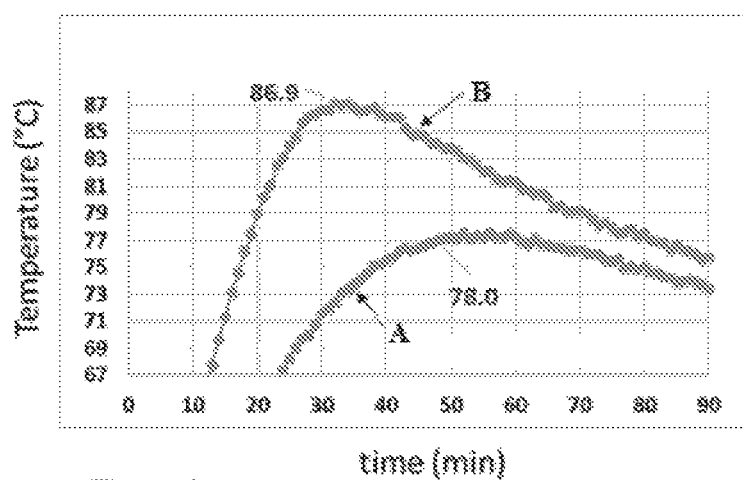

The present disclosure will now be described with the help of the accompanying drawing, in which:

FIG. 1 illustrates a graphical representation of the self-limiting property of the catalyst system having long chain non-fluorinated fatty acid derivative and the catalyst system having long chain fluorinated fatty acid derivative (trifluoro ethyl myristate); and FIG. 2 illustrates a graphical representation of the self-limiting property of the catalyst system having long chain non-fluorinated fatty acid derivative and the catalyst system having long chain fluorinated fatty acid derivative (trifluoro ethyl palmitate).

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, known processes or well-known apparatus or structures, and well known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure are not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third, etc., when used herein do not imply a specific sequence or order unless clearly suggested by the present disclosure.

During polymerization of the olefins by using Ziegler Natta Catalyst, if the temperature of the reaction mixture is increased beyond the softening temperature of the polyolefin, agglomeration of the polymer resins can take place, which will result in the formation of big chunks in the reactor. At commercial scale, formation of lumps creates operational issues, which cause fouling of the reactor. In view of the same, the reaction temperature during polymerization can be lowered by either designing the reactor in such a way that it can efficiently remove the heat of reaction and can maintain the desired reaction temperature during the polymerization or by the addition of an external reaction controlling agents which can deactivate the catalyst at predetermined reaction temperatures.

Therefore, the present disclosure provides a Ziegler-Natta catalyst system comprising an external donor system that exhibit self-extinguishing property and helps in producing a polyolefin with desired isotacticity.

In accordance with one aspect of the present disclosure, there is provided a Ziegler-Natta catalyst system for olefin polymerization. The catalyst system of the present disclosure has self-extinguishing properties.

In accordance with the present disclosure, the Ziegler-Natta catalyst system with self-extinguishing propelties suitable for olefin polymerization being characterized by having a fluorinated ester of a long chain fatty acid with C4-C20 carbon atoms as an activity limiting agent.

The activity limiting agent used in the Ziegler-Natta catalyst system of the present disclosure 15 is a fluorinated ester of a long chain fatty acid with C4-C20 carbon atoms having the fallowing formula

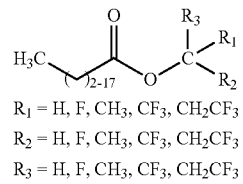

$R_1$ = H, F, $CH_3$, $CF_3$, $CH_2CF_3$
$R_2$ = H, F, $CH_3$, $CF_3$, $CH_2CF_3$
$R_3$ = H, F, $CH_3$, $CF_3$, $CH_2CF_3$

In an embodiment, the activity limiting agent is fluorinated ester of a long chain tatty acid selected from the group consisting of trifluoro ethylmyristate and trifluoro ethyl palmitate. The activity limiting agent used in Ziegler-Natta catalyst system of the present disclosure is mixed with a selectivity control agent.

In accordance with the present disclosure, the Ziegler-Natta catalyst system of the present disclosure comprises a pro-catalyst comprising a magnesium compound, a titanium compound and an internal donor; an organo-aluminum co-catalyst, and an external donor having a mixture of a selectivity control agent and an activity limiting agent.

In accordance with the present disclosure, the internal donor is at least one compound selected from the group consisting of monoester, diester, diether, carbonate, urea, thiourea, ether-ester, succinates, and malonates.

The titanium compound used in the pro-catalyst is at least one selected from the group consisting of titanium tetrachloride, titanium trichloride, titanium dichloride, and elemental titanium.

The magnesium compound used in the pro-catalyst is at least one selected from the group consisting of magnesium halide, magnesium oxide, magnesium hydroxyl halides, and magnesium salts of inorganic oxygen containing acids.

In accordance with the present disclosure, magnesium present in the catalyst system is in range of 15 wt % to 19 wt %.

The organo-aluminum co-catalyst is at least one selected from the group consisting of triethylaluminum, tridecylaluminum, tri-n-butylaluminum, tri-isopropylaluminum, tri-isoprenylaluminum, tri-isobutylaluminum, ethyl aluminum sesquichloride, diethylaluminum chloride, di-isobutyl aluminum chloride, triphenylaluminum, tri-n-octylaluminum, and tri-n-decylaluminum. In an embodiment, the organo-aluminum co-catalyst is triethylaluminum.

In accordance with the present disclosure, the selectivity control agent is at least one silane compound selected from the group consisting of dicyclopentyldimethoxysilane, methylcyclohexyldimethoxysilane, diisopropyldimethoxysilane, methylcyclohexyldiethoxysilane, di-n-butyl-dimethoxysilane, and dimethyidimethoxysilane.

The weight ratio of the selectivity control agent to the activity limiting agent is in the range of 1:5 to 1:10.

The mole ratio of the co-catalyst and titanium is 50:1 to 500:1, the mole ratio of the co-catalyst and the selectivity control agent is in the range of 2:1 to 50:1 and the mole ratio of the co-catalyst and the activity limiting agent is in the range of 2:1 to 10:1.

In another aspect of the present disclosure, there is provided a process for in-situ preparation of a Ziegler Natta Catalyst system for olefin polymerization. The process comprises charging a reactor with a hydrocarbon fluid medium and a predetermined amount of pro-catalyst comprising a magnesium compound, a titanium compound, and an internal donor, under inert atmosphere, to obtain a pro-catalyst slurry. A predetermined amount of an external donor having a mixture of selectivity control agent and the activity limiting agent is added in the pro-catalyst slurry to obtain a first slurry. An organo-aluminum co-catalyst is added in the first slurry to obtain the Ziegler Natta Catalyst system.

The hydrocarbon fluid medium is selected from hexane, and heptane. In one embodiment, the hydrocarbon fluid medium is hexane.

In accordance with yet another aspect of the present disclosure there is provided a process for the preparation of polyolefin. The process comprises charging a reactor with a hydrocarbon fluid medium and a Ziegler-Natta catalyst system under inert atmosphere to obtain slurry. The Ziegler-Natta catalyst system of the present disclosure comprises a pro-catalyst comprising a magnesium compound, a titanium compound, an internal donor, an organo-aluminum co-catalyst, and an external donor having a selectivity control agent and an activity limiting agent. An olefin is introduced in the reactor comprising hydrocarbon fluid medium, Ziegler Natta catalyst system of the present disclosure, to attain a pressure in the range of 1 kg/cm$^2$ to 10 kg/cm$^2$ to obtain a reaction mixture. The olefin is at least one selected from the group consisting of propylene and ethylene. In an exemplary embodiment, the olefin is propylene. The olefin is subjected to polymerization by heating the reaction mixture at a temperature in the range of 40° C. to 75° C. under stirring for a time period in the range of 1 hour to 5 hours to obtain a product mixture. The polymerization reaction is terminated by adding a chain terminating agent to the reactor. In an embodiment, the chain terminating agent is hydrogen. In accordance with the present disclosure, the chain terminating agent such as hydrogen which controls the molecular weight and MFI of the final polymer product (polymer resin).

After the termination of the polymerization, the reactor is cooled to a temperature in the range of 25° C. to 35° C. After cooling, the reactor is degassed to obtain a product mass. The product mass is filtered to obtain a solid and a filtrate. The so obtained solid is dried to obtain the polyolefin. Polyolefin obtained using the process of the present disclosure is characterized by having the isotacticity greater than 97%.

In accordance with present disclosure, the Ziegler-Natta catalyst system comprises the selectivity control agent and the activity limiting agent. The selectivity control agent helps to produce the polyolefin having desired isotacticity, and the activity limiting agent helps to control the temperature of the reaction, thereby not allowing the temperature to go beyond softening temperature of the polyolefin.

Thus, the Ziegler-Natta catalyst system of the present disclosure exhibits the self-extinguishing properties. The polymerization of the olefin is an exothermic reaction. Therefore, as the reaction progresses, the temperature of the reaction mixture increases. If the temperature of the reaction mixture is increased beyond the softening temperature of the polyolefin, the agglomeration of the polymer resins can take place, which will result in the formation of big chunks in the reactor. At commercial scale, formation of lumps creates operational issues, which cause fouling of the reactor.

The activity limiting agent used as an external donor in the Ziegler-Natta catalyst system, at a temperature greater than 80° C. to 82° C., poisons the active site of the catalyst system. Therefore, at temperature greater than 80° C. to 82° C., the activity of the catalyst system decreases thereby lowering the rate of the polymerization reaction. Thus, the Ziegler-Natta catalyst system of the present disclosure controls the reaction temperature below the softening temperature of polyolefin, thereby controlling the fouling of the reactor. In an embodiment, the self-extinguishing property of the Ziegler Natta catalyst system of the present disclosure is triggered at a temperature in the range from 86° C. to 78° C.

The activity control agent of the present disclosure are designed in such way that it does not obstruct the performance of selectivity controlling agent at different Al/Ti and Al/external donor system ratios.

Further, it is been observed that MFI in the range of 1.0 to 10.0 can be achieved by using different amount hydrogen.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Comparative Example

Polymerization Performance Study of Catalyst System Having Long Chain Non-Fluorinated Fatty Acid Derivative The slurry phase polymerization of propylene was carried out using the following procedure.

In a preheated, moisture free stainless steel jacketed 5 L CSTR reactor containing a magnetic stirrer: 2 L n-hexane was added as a medium. 70 mg of MgCl$_2$ supported TiCl$_4$ catalyst (procatalyst) (having 7 mg of diisobutyl phthalate internal donor in procatalyst) and mixed external donor such as 757.1 mg of isopropyl myristate as activity limiting agent and 84.1 mg of dicyclopentyl dimethoxy silane as selectivity control agent was added into the reactor followed by adding 13 mL of triethyl aluminium (10% v/v in hexane) as a cocatalyst. 300 ml of hydrogen as a chain terminating agent was added into the reactor under ambient conditions (25° C.).

Propylene gas was introduced into the reactor and the pressure was raised to 5 kg/cm² and the reactor temperature was raised to 70° C. Polymerization was carried out in the slurry phase for 120 min maintaining reactor pressure of 5.0 kg/cm². After 120 min of the polymerization reaction, the reactor temperature was set for ambient temperature. The cooled reactor was degassed slowly to atmospheric pressure. The hexane was removed and polymer was collected/dried.

TABLE 1

Polymerization performance study of conventional catalyst system having long chain non-fluorinated fatty acid derivatives

| Entry. No | TEAL/ Ti | TEAL/ ED | C3 pressure (kg/cm²) | H₂ amount (mL) | Productivity (Kg/g) | MFI | XS (wt %) | BD (UT) gm/cc | BD (T) gm/cc | PSD (μm) |
|---|---|---|---|---|---|---|---|---|---|---|
| 1. | 250 | 3 | 5 | 300 | 7.0 | 2.1 | 1.2 | 0.43 | 0.55 | 328 |

MFI—Melt flow index
BD (UT)—bulk density (Untapped)
BD (T)—bulk density (Tapped)
PSD—Particle size distribution For evaluating the self-limiting property of the catalyst system, after the introduction of propylene (5.0 kg/cm²) the reactor temperature was raised to 70° C. The temperature controlling device was removed and observed the reaction temperature. The reactor temperature was increased to a maximum of 86.9° C. due to exo-thermicity of the reaction and subsequently temperature decreases to room temperature (25-30° C.). The propylene supply was cut off and reactor was degassed slowly to atmospheric pressure. The hexane was removed and polymer was collected/dried. No agglomeration was found in reactor and polymer resin indicating absence of run-away reactions and polymerization was self-extinguished in the presence of the catalyst system.

Self-limiting temperature=86.9° C.

Experiment 1

Polymerization Performance Study of Catalyst System Having Long Chain Fluorinated Fatty Acid Derivative (Trifluoro Ethyl Myristate)

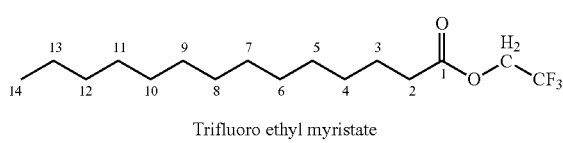 [SMILES: CCCCCCCCCCCCCC(=O)OCC(F)(F)F]

Trifluoro ethyl myristate

The slurry phase polymerization of propylene was carried out using the following procedure.

In a preheated, moisture free stainless steel jacketed 5 L CSTR reactor containing a magnetic stirrer; 2 L n-hexane was added as a medium. 70 mg of MgCl₂ supported TiCl₄ catalyst (procatalyst) (having 7 mg of diisobutyl phthalate internal donor in procatalyst) and mixed external donor such as 867.6 mg of trifluoro ethyl myristate as activity limiting agent and 84.1 mg of dicyclopentyl dimethoxy silane as selectivity control agent was added into the reactor followed by adding 13 mL of triethyl aluminium (10% v/v in hexane) as a cocatalyst. 300 ml of hydrogen as a chain terminating agent was added into the reactor under ambient conditions (25° C.).

Propylene gas was introduced into the reactor and pressure was raised to 5 kg/cm² and the reactor temperature was raised to 70° C. Polymerization was carried out in the slurry phase for 120 min maintaining reactor pressure of 5 kg/cm². After 120 min of the polymerization reaction, the reactor temperature was set for ambient temperature. The cooled reactor was degassed slowly to atmospheric pressure. The hexane was removed and polymer was collected/dried.

TABLE 2

Polymerization performance study of catalyst system of the present disclosure having long chain fluorinated fatty acid derivative (Trifluoro ethyl myristate)

| Entry. No | TEAL/ Ti | TEAL/ ED | C3 pressure (kg/cm²) | H2 amount (mL) | Productivity (Kg/g) | MFI | XS (wt %) | BD (UT) gm/cc | BD (T) gm/cc | PSD (μm) |
|---|---|---|---|---|---|---|---|---|---|---|
| 1. | 250 | 3 | 5 | 300 | 4.0 | 1.3 | 1.0 | 0.47 | 0.51 | 329 |

For evaluating the self-limiting property of the catalyst system, after the introduction of propylene (5.0 kg/cm²) the reactor temperature was raised to 70° C. The temperature controlling device was removed and observed the reaction temperature. The reactor temperature was increased to a maximum of 81.3° C. due to exo-thermicity of the reaction and subsequently temperature decreases to room temperature (25-30° C.). The propylene supply was cut off and reactor was degassed slowly to atmospheric pressure. The hexane was removed and polymer was collected/dried. No agglomeration was found in reactor and polymer resin indicating absence of run-away reactions and polymerization was self-extinguished in the presence of the catalyst system.

Self-limiting temperature=81.3° C.

Experiment 2

Polymerization Performance Study of Catalyst System Having Long Chain Fluorinated Fatty Acid Derivative (Trifluoro Ethyl Palmitate)

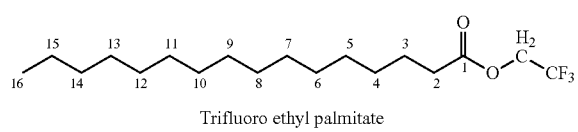 [SMILES: CCCCCCCCCCCCCCCC(=O)OCC(F)(F)F]

Trifluoro ethyl palmitate

The slurry phase polymerization of propylene was carried out using the following procedure.

In a preheated, moisture free stainless steel jacketed 5 L CSTR reactor containing a magnetic stirrer; 2 L n-hexane was added as a medium. 70 mg of $MgCl_2$ supported $TiCl_4$ catalyst (procatalyst) (having 7.0 mg of diisobutyl phthalate internal donor in procatalyst) and mixed external donor such as 945 mg of trifluoro ethyl palmitate as activity limiting agent and 84.1 mg of dicyclopentyl dimethoxy silane as selectivity control agent was added into the reactor followed by adding 13 mL of triethyl aluminium (10% v/v in hexane) as a cocatalyst. 300 ml of hydrogen as a chain terminating agent was added into the reactor under ambient conditions (25° C.).

Propylene gas was introduced into the reactor and pressure was raised to 5 kg/cm² and the reactor temperature was raised to 70° C. Polymerization was carried out in the slurry phase for 120 min maintaining reactor pressure of 5 kg/cm². After 120 min of the polymerization reaction, the reactor temperature was set for ambient temperature. The cooled reactor was degassed slowly to atmospheric pressure. The hexane was removed and polymer was collected/dried.

TABLE 3

Polymerization performance study of catalyst system of the present disclosure having long chain fluorinated fatty acid derivative (Trifluoro ethyl palmitate)

| Entry. No | TEAL/ Ti | TEAL/ ED | C3 pressure (kg/cm²) | H2 amount (mL) | Productivity (Kg/g) | MFI | XS (wt %) | BD (UT) gm/cc | BD (T) gm/cc | PSD (μm) |
|---|---|---|---|---|---|---|---|---|---|---|
| 1 | 250 | 3 | 5 | 300 | 4.6 | 1.0 | 2.5 | 0.47 | 0.52 | 216 |

For evaluating the self-limiting property of the catalyst system, after the introduction of propylene (5 kg/cm²) the reactor temperature was raised to 70° C. The temperature controlling device was removed and observed the reaction temperature. The reactor temperature was increased to a maximum of 78° C. due to exo-thermicity of the reaction and subsequently temperature decreases to room temperature (25-30° C.). The propylene supply was cut off and reactor was degassed slowly to atmospheric pressure. The hexane was removed and polymer was collected/dried. No agglomeration was found in reactor and polymer resin indicating absence of run-away reactions and polymerization was self-extinguished in the presence of the catalyst system.

Self-limiting temperature=78° C.

The thermal analysis and molecular weight analysis of the so obtained resin have been done.

The results are illustrated in Table 4 and 5.

TABLE 4

The thermal analysis of polymer resin

| Expt details | Particulars | Tc (° C.) | Tm (° C.) | iiH (J/g) | Xc (%) |
|---|---|---|---|---|---|
| Comparative Example | Thermal analysis of Catalyst system Having long chain non-fluorinated fatty acid derivative | 117.0 | 159.0 | 107 | 52 |
| 1 | Thermal analysis of catalyst system having long chain fluorinated fatty acid ester (trifluoro ethyl myristate) | 120.0 | 160.0 | 108 | 52 |
| 2 | Thermal analysis of catalyst system having long chain fluorinated fatty acid ester (trifluoro ethyl palmitate) | 117.0 | 158.0 | 107 | 52 |

Tc: case temperature
Tm: melting temperature
ΔH: Enthalpy
$X_c$: % Crystallinity

TABLE 5

Molecular weight analysis a polymer resin

| Expt details | Particulars | Mn × 10" | Mw × 10" | PDI |
|---|---|---|---|---|
| Comparative Example | Molecular weight & PDI of catalyst system having long chain non-fluorinated fatty acid derivative | 9.7 | 49.9 | 5.1 |
| 1 | Molecular weight & PDI of catalyst system having long chain fluorinated fatty acid ester (trifluoro ethyl myristate) | 10.9 | 56.2 | 5.2 |
| 2 | Molecular weight & PD1 of catalyst system having long chain fluorinated fatty acid ester (trifluoro ethyl palmitate) | 13.1 | 68.3 | 5.2 |

PDI—polydispersity index
Mn—Number average molecular weight;
Mw—Weight average molecular weight It is depicted from the results provided in Table 4 and 5 that, the uses of novel fluorinated fatty acid as activity control (self-limiting) property used in the external electron donor of Ziegler Natta catalysis has improved process properties such as no agglomeration of the polyolefins. The combination of fluorinated fatty acid with silane compounds as external electron in Ziegler Natta catalysis provides polymer resin with high isotacticity and ability to limit agglomeration issues through its self-limiting characteristics in Ziegler Natta catalysis.

The catalyst system of the present disclosure has better control over run-away reactors that can limit reactor chocking and loss in production.

TECHNICAL ADVANCES AND ECONOMICAL SIGNIFICANCE

The present disclosure described herein above has several technical advantages including, but not limited to, the realization of a Ziegler-Natta catalyst system, that:

employs an external electron donor system, which helps in maintaining the process at a temperature below softening temperature of polyolefin; and employs an external electron donor system which helps in producing the polyolefin with high isotacticity.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/flower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A Ziegler-Natta catalyst system with self-extinguishing properties suitable for olefin polymerization, said catalyst system being characterized by having a fluorinated ester of a long chain fatty acid with $C_4$-$C_{20}$ carbon atoms as an activity limiting agent.

2. The Ziegler-Natty catalyst system as claimed in claim 1, wherein said activity limiting agent is a fluorinated ester of a long chain fatty acid with $C_4$-$C_{20}$ carbon atoms having the following formula:

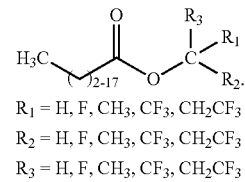

$R_1$ = H, F, $CH_3$, $CF_3$, $CH_2CF_3$
$R_2$ = H, F, $CH_3$, $CF_3$, $CH_2CF_3$
$R_3$ = H, F, $CH_3$, $CF_3$, $CH_2CF_3$

3. The Ziegler-Natta catalyst system as claimed in claim 2, wherein said activity limiting agent is a fluorinated ester of a long chain fatty acid selected from the group consisting of trifluoro ethyl myristate and trifluoro ethyl palmitate.

4. The Ziegler-Natta catalyst system as claimed in claim 1, wherein a selectivity control agent is mixed with said activity limiting agent in a weight ratio in the range of 1:5 to 1:10.

5. The Ziegler-Natta catalyst system with self-extinguishing properties suitable for olefin polymerization as claimed in claim 1, wherein said catalyst system comprises:
   a. a pro-catalyst comprising a magnesium compound, a titanium compound, and an internal donor;
   b. an organo-aluminum co-catalyst; and
   c. an external donor being a mixture of a selectivity control agent and said activity limiting agent as claimed in claim 1.

6. The Ziegler-Natta catalyst system as claimed in claim 5, wherein said internal donor is at least one compound selected from the group consisting of monoester, diester, diether, carbonate, urea, thiourea, ether-ester, succinates, malonates, and diisobutyl phthalate.

7. The Ziegler-Natta catalyst system as claimed in claim 5, wherein said selectivity control agent is at least one silane compound selected from the group consisting of dicyclopentyldimethoxysilane, methylcyclohexyldimethoxysilane, diisopropyldimethoxysilane methylcyclohexyldiethoxysilane, di-n-butyl-dimethoxysilane, and dimethyidimethoxysilane.

8. The Ziegler-Natta catalyst system as claimed in claim 5, wherein said titanium compound is at least one selected from the group consisting of titanium tetrachloride, titanium trichloride, titanium dichloride, and elemental titanium.

9. The Ziegler-Natty catalyst system as claimed in claim 5, wherein said magnesium compound is at least one selected from the group consisting of magnesium halide, magnesium oxide, magnesium hydroxyl halides, and magnesium salts of inorganic oxygen containing acids.

10. The Ziegler-Natty catalyst system as claimed in claim 5, wherein the organo-aluminum co-catalyst is at least one selected from the group consisting of triethylaluminum, tridecylaluminum, tri-n-butylaluminum, tri-isopropylaluminum, tri-isoprenylaluminum, triisobutylaluminum, ethyl aluminum sesquichloride, diethylaluminum chloride, di-isobutyl aluminum chloride, triphenylaluminum, tri-n-octylaluminum and tri-ndecylaluminum.

11. The Ziegler-Natta catalyst system as claimed in claim 5, wherein the mole ratio of said co-catalyst to said titanium is in the range of 50:1 to 500:1.

12. The Ziegler-Natta catalyst system as claimed in claim 5, wherein the mole ratio of said co-catalyst to said selectivity control agent is in the range of 2:1 to 50:1.

13. The Ziegler-Natta catalyst system as claimed in claim 5, wherein the mole ratio of said co-catalyst to said activity control agent is in the range of 2:1 to 10:1.

14. The Ziegler-Natta catalyst system as claimed in claim 5, wherein the self-extinguishing property of said catalyst system is triggered at a temperature in the range from 86° C. to 78° C.

15. The Ziegler-Natta catalyst system as claimed in claim 5, includes nonpolar fluid medium, wherein said non-polar fluid medium is selected from hexane and heptane.

16. A process for in situ preparation of a Ziegler Natta Catalyst system as claimed in claim 1 suitable for olefin polymerization, said process comprising the following steps:
   i. charging a reactor with a hydrocarbon fluid medium and a predetermined amount of a pro-catalyst comprising a magnesium compound, a titanium compound, and an internal donor, under inert atmosphere, to obtain a pro-catalyst slurry;
   ii. adding a predetermined amount of an external donor being a mixture of a selectivity control agent and a fluorinated ester of a long chain fatty acid with C4-C20 carbon atoms as an activity limiting agent in said pro-catalyst slurry to obtain a First slurry; and
   iii. adding an organo-aluminum co-catalyst in said first slurry to obtain said Ziegler Natta Catalyst system.

17. The process for olefin polymerization using said Ziegler Natta Catalyst system as claimed in claim 16, said process comprises introducing an olefin into the reactor containing said Ziegler Natta Catalyst system to attain an olefin pressure in the range of 1 kg/cm2 to 10 kg/cm2 to obtain a reaction mixture; and subjecting said olefin to polymerization by beating said reaction mixture at a temperature in the range of 40° C. to 75° C. under stirring for a time period in the range of 1 hour to 5 hours to obtain a product mixture comprising polymer.

18. The process as claimed in claim 17, wherein said olefin is selected from the group consisting of propylene and ethylene.

\* \* \* \* \*